No. 660,563. Patented Oct. 30, 1900.
L. K. DAVIS.
APPARATUS FOR PREVENTING FREEZING OF FILTERS.
(Application filed Mar. 5, 1900.)
(No Model.)
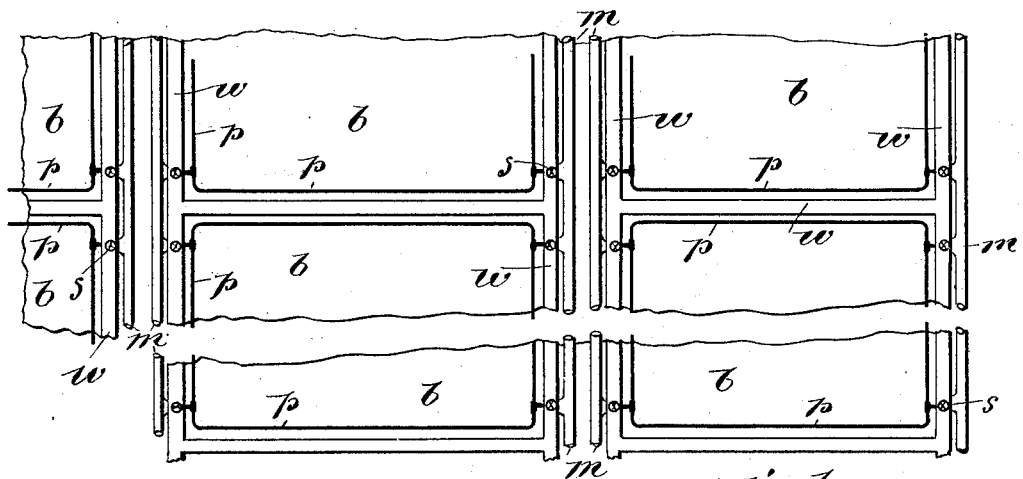
Fig. 1.
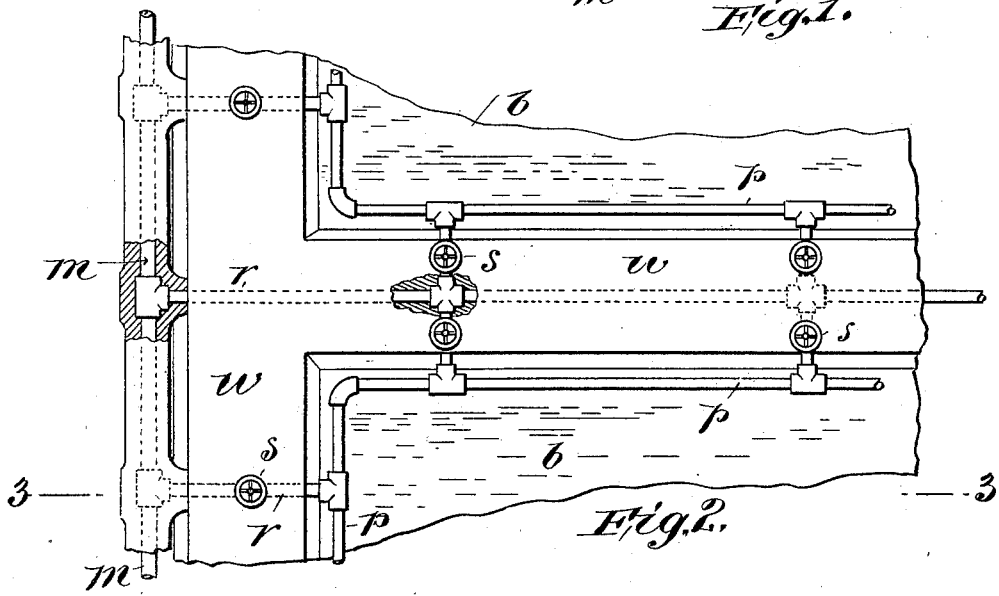
Fig. 2.
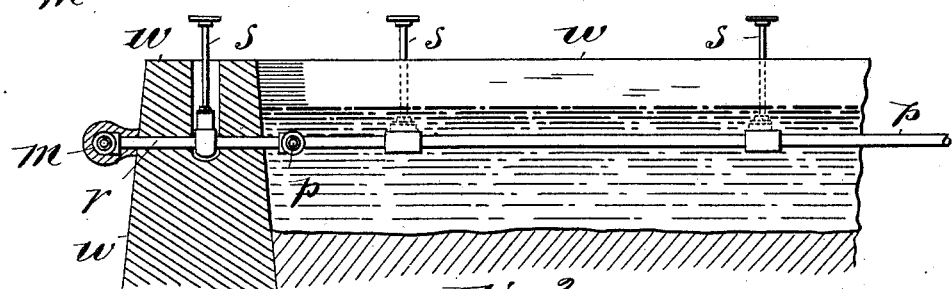
Fig. 3.
Witnesses:
C. W. Benjamin
Henry A. Morton
Inventor:
Lewis K. Davis
by 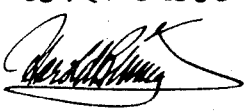 atty

UNITED STATES PATENT OFFICE.

LEWIS K. DAVIS, OF INDIANAPOLIS, INDIANA.

APPARATUS FOR PREVENTING FREEZING OF FILTERS.

SPECIFICATION forming part of Letters Patent No. 660,563, dated October 30, 1900.

Application filed March 5, 1900. Serial No. 7,274. (No model.)

*To all whom it may concern:*

Be it known that I, LEWIS K. DAVIS, having my post-office address and residence at Indianapolis, Indiana, have invented certain new and useful Improvements in Apparatus for Protecting Exposed Filters and other Confined Bodies of Liquid from Freezing, of which the following is a specification, illustrated by drawings showing one type of the invention.

I will describe my invention in its relation to a particular type of filter-bed to which it is peculiarly fitted, and from this the general nature of the invention as applied to other conditions should readily be apprehended.

Let us suppose a filter-bed or a number of them, each perhaps an acre in extent and containing filtering layers of sand, &c., covered by a thin layer of water, perhaps a foot or two in depth. The object is to keep such a body of water from freezing, so as to avoid the mechanical troubles arising from ice and also to prevent the shutting out of air by the ice layer, as it is highly desirable that freedom to absorb oxygen by the water should not be interrupted. It is neither practical nor desirable to directly protect the entire surface of the water by a network or gridwork of heating-pipes; but I have discovered that it is sufficient for practical purposes if the ice is prevented from forming at the margin of the body of water, because, as is well known, crystallization does not take place readily in a body of liquid unless there are solid particles or points from which the crystals may start. Applying this principle to the practical problem of preventing the freezing of such a body of water as we have just supposed, I have found that if heat is supplied just beneath the surface and around the margin the entire sheet of water the ice crystals, even if they form on the walls of the filter, are prevented by the heat from crossing the line of heated water, and thus, in addition to the actual heating of the water and any consequent circulation, I indirectly prevent the formation of ice crystals in the central portions of the sheet of water at the surface, because there are no solid points there to facilitate crystallization. In addition to this indirect effect the heating of the marginal portions of the water causes some circulation toward or from the middle.

In another application, filed of even date with this and numbered 7,275, I have applied for protection on the new process of protecting filters and other bodies of water. In the present application I seek protection for the apparatus.

In the drawings, Figure 1 is a small-scale plan view of a portion of four such filter-beds as I have described, one of them being marked $b$. One or more steam-pipes $p$ extend around the entire margin. Fig. 2 is a detail partial plan view, on a larger scale; and Fig. 3 is a partial vertical sectional view.

The steam-pipe $p$ in the system illustrated must be open at some point, so as to allow the condensed steam to run out, no return or exhaust pipe being shown. This pipe $p$ is placed only a few inches beneath the surface, and preferably only an inch or two from the wall $w$ of the filter. It is supplied with steam and is also supported by the pipes $r$, provided with inlet-valves $s$, as shown. The pipes $r$ are supplied from the mains $m$, which are preferably heavily protected by asbestos or other non-conducting material, as shown. When the cold weather is over, the pipes $p$ may be disconnected from the pipes $r$ and entirely removed from the filters. Owing, however, to their being arranged annularly—that is to say, only around the edge or margin of the water—they do not interfere with the removal or the washing of the sand-bed or filter $f$.

As this application refers exclusively to my improvement in the machine or article, I want it to be clearly understood that I seek protection for my improvement in the art in the other patent application.

Having now fully set forth and explained one form of my invention, I claim as the novel features that characterize it the following:

1. In combination in and with a filter or other liquid-holding receptacle wherein the liquid is exposed to freezing, a means for supplying heat beneath the surface of the liquid near the side and end walls of the said receptacle whereby a circulation may take place toward the center and from the walls, substantially as set forth.

2. In combination in and with a filter or other liquid-holding receptacle wherein the liquid is exposed to freezing, a means for locally heating the marginal portions of the liquid near its surface, substantially as set forth.

3. In combination in and with a filter or other liquid-holding receptacle wherein the liquid is exposed to freezing, an annular pipe or fluid-conductors for heated fluid supported in the immediate vicinity of the marginal portions of said liquid near its surface, substantially as set forth.

4. In combination in and with a filter or other liquid-holding receptacle wherein the liquid is exposed to freezing, steam-supply pipes exterior to the said receptacle and steam heating-pipes supported within said receptacle slightly below the normal liquid-level at which the receptacle operates and connected with said supply-pipes, substantially as set forth.

Signed this 26th day of February, 1900, at New York, N. Y.

LEWIS K. DAVIS.

Witnesses:
GEORGE H. SONNEBORN,
HAROLD BINNEY.